(12) United States Patent
Sharifi et al.

(10) Patent No.: US 10,509,531 B2
(45) Date of Patent: Dec. 17, 2019

(54) GROUPING AND SUMMARIZATION OF MESSAGES BASED ON TOPICS

(71) Applicant: Google LLC, Mountain View, CA (US)

(72) Inventors: Matthew Sharifi, Kilchberg (CH); Jakob Nicolaus Foerster, Zurich (CH)

(73) Assignee: Google LLC, Mountain View, CA (US)

( * ) Notice: Subject to any disclaimer, the term of this patent is extended or adjusted under 35 U.S.C. 154(b) by 103 days.

(21) Appl. No.: 15/437,223

(22) Filed: Feb. 20, 2017

(65) Prior Publication Data

US 2018/0239495 A1 Aug. 23, 2018

(51) Int. Cl.
| | | |
|---|---|---|
| *G06F 3/0481* | (2013.01) | |
| *H04L 29/08* | (2006.01) | |
| *H04L 12/58* | (2006.01) | |
| *G06F 17/27* | (2006.01) | |
| *G06F 17/21* | (2006.01) | |
| *G06Q 10/10* | (2012.01) | |

(52) U.S. Cl.
CPC ........... *G06F 3/0481* (2013.01); *G06F 17/21* (2013.01); *G06F 17/278* (2013.01); *G06Q 10/10* (2013.01); *G06Q 10/107* (2013.01); *H04L 51/12* (2013.01); *H04L 67/306* (2013.01)

(58) Field of Classification Search
CPC .................................................. G06F 3/0481
See application file for complete search history.

(56) References Cited

U.S. PATENT DOCUMENTS

| | | | |
|---|---|---|---|
| 8,335,827 B2 | 12/2012 | Mishchenko | |
| 8,959,163 B1* | 2/2015 | Ledet | H04L 67/306 |
| | | | 709/206 |
| 9,146,656 B1* | 9/2015 | Srinivasan | G06F 3/0482 |
| 9,245,013 B2* | 1/2016 | Oliver | H04L 51/18 |
| 9,558,165 B1* | 1/2017 | Marsten | G06F 17/24 |
| 9,560,152 B1* | 1/2017 | Jamdar | H04L 67/22 |
| 2003/0131055 A1 | 7/2003 | Yashchin et al. | |
| 2004/0117736 A1* | 6/2004 | Newman | G06Q 10/107 |
| | | | 715/256 |
| 2005/0262199 A1 | 11/2005 | Chen et al. | |
| 2006/0161947 A1* | 7/2006 | Laksono | H04N 7/165 |
| | | | 725/34 |

(Continued)

OTHER PUBLICATIONS

PCT International Search Report and Written Opinion dated Jan. 4, 2018 for PCT International Application No. PCT/US2017/059328, 12 pages.

(Continued)

*Primary Examiner* — William L Bashore
*Assistant Examiner* — Nathan K Shrewsbury
(74) *Attorney, Agent, or Firm* — IP Spring

(57) ABSTRACT

A computer-executed technique for grouping and summarizing messages in a graphical user interface (GUI) of a communication application includes received messages and determining a plurality of communication topics therein. The messages are clustered into groups based on the communication topics such that messages in each group relate to the same topic. The messages are displayed in the GUI in the determined groups. A user can select a group to ungroup and view the messages. The communication topics upon which the clustering is based may be specific to each user in the communication session.

20 Claims, 8 Drawing Sheets

(56) References Cited

U.S. PATENT DOCUMENTS

| | | | |
|---|---|---|---|
| 2006/0168026 A1* | 7/2006 | Keohane | H04L 51/04 709/206 |
| 2006/0235933 A1* | 10/2006 | Baluja | G06Q 10/107 709/207 |
| 2006/0248175 A1* | 11/2006 | Jinks | G06Q 10/107 709/223 |
| 2007/0124469 A1* | 5/2007 | Mohammed | H04L 67/24 709/225 |
| 2008/0263157 A1 | 10/2008 | Bhogal et al. | |
| 2008/0281927 A1 | 11/2008 | Vanderwende et al. | |
| 2008/0313180 A1 | 12/2008 | Zeng et al. | |
| 2009/0177484 A1* | 7/2009 | Davis | G06Q 30/02 705/346 |
| 2009/0234878 A1* | 9/2009 | Herz | G06Q 20/383 |
| 2010/0175003 A1 | 7/2010 | Castellucci | |
| 2010/0205541 A1* | 8/2010 | Rapaport | G06Q 10/10 715/753 |
| 2010/0306249 A1* | 12/2010 | Hill | G06Q 30/02 707/769 |
| 2010/0332518 A1 | 12/2010 | Song et al. | |
| 2011/0041082 A1* | 2/2011 | Nguyen | G06Q 10/10 715/752 |
| 2011/0126126 A1* | 5/2011 | Blair | G06Q 10/107 715/752 |
| 2011/0173264 A1* | 7/2011 | Kelly | G06Q 10/10 709/205 |
| 2011/0320441 A1* | 12/2011 | Lee | G06F 16/9535 707/723 |
| 2012/0066073 A1* | 3/2012 | Dilip | G06Q 30/0269 705/14.66 |
| 2012/0066618 A1* | 3/2012 | Barker | G06Q 10/107 715/753 |
| 2012/0089681 A1* | 4/2012 | Chowdhury | H04L 12/6418 709/206 |
| 2012/0179449 A1* | 7/2012 | Raskino | G06F 16/345 704/2 |
| 2013/0006973 A1 | 1/2013 | Caldwell et al. | |
| 2013/0013702 A1* | 1/2013 | Ebisawa | G06F 11/0703 709/206 |
| 2013/0124651 A1* | 5/2013 | Ding | H04L 29/08072 709/206 |
| 2013/0232263 A1* | 9/2013 | Kelly | H04L 43/10 709/224 |
| 2013/0311556 A1* | 11/2013 | Srivastava | G06Q 50/01 709/204 |
| 2014/0019443 A1* | 1/2014 | Golshan | G06F 17/30867 707/723 |
| 2014/0074843 A1* | 3/2014 | White | G06Q 10/107 707/737 |
| 2014/0096033 A1* | 4/2014 | Blair | G06F 3/01 715/752 |
| 2014/0172837 A1* | 6/2014 | Sommer | G06Q 50/01 707/722 |
| 2014/0189000 A1* | 7/2014 | Zhang | H04L 43/045 709/204 |
| 2014/0189536 A1* | 7/2014 | Lange | H04L 67/22 715/753 |
| 2014/0365504 A1* | 12/2014 | Franceschini | G06N 5/046 707/748 |
| 2015/0052203 A1* | 2/2015 | Karnin | H04L 51/22 709/206 |
| 2015/0074194 A1 | 3/2015 | Schabes et al. | |
| 2015/0106360 A1* | 4/2015 | Cao | G06Q 10/00 707/723 |
| 2015/0120680 A1 | 4/2015 | Alonso et al. | |
| 2015/0161670 A1* | 6/2015 | Shen | G06Q 30/0269 705/14.66 |
| 2015/0188870 A1* | 7/2015 | Sharp | H04L 51/22 715/752 |
| 2016/0048556 A1* | 2/2016 | Kelly | G06F 16/9535 707/767 |
| 2016/0337281 A1* | 11/2016 | Breedvelt-Schouten | H04L 51/063 |
| 2016/0337286 A1* | 11/2016 | Bastide | H04L 51/12 |
| 2016/0364368 A1 | 12/2016 | Chen et al. | |
| 2018/0006973 A1* | 1/2018 | Hays | H04L 51/02 |
| 2018/0159808 A1* | 6/2018 | Pal | H04L 51/22 |
| 2018/0191649 A1* | 7/2018 | Qian | H04L 51/16 |
| 2018/0191813 A1* | 7/2018 | Harpaz | H04L 67/1023 |

OTHER PUBLICATIONS

WIPO, International Preliminary Report on Patentability for International Patent Application No. PCT/US2017/059328, dated Aug. 20, 2019, 6 pages.

* cited by examiner

GROUPING AND SUMMARIZATION OF MESSAGES BASED ON TOPICS

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In typical communication applications, text-based messages in a communication session (such as an instant message, short message service message, or social network message/posting) are presented chronologically in a list in a graphical user interface of the communication application displayed by a computing device. The use of such a chronologically ordered list may have a number of limitations, especially when there are a large number of messages to be displayed. A communication session may include many messages that were sent over a long period of time (days, weeks, etc.). In order for a user to find a previously sent message of interest, the user may have to scroll through the list of messages, and scan the contents of each of the messages to locate the desired message (or collection of messages). In some situations, the user may remember an approximate date/time of the message of interest, which may be used to narrow the possible locations of the message of interest for the user. Nonetheless, even when the user has a general idea of the approximate date and time of a message of interest, locating the specific message of interest may be a time consuming and bothersome process.

SUMMARY

According to various implementations of the present disclosure, a technique for grouping and summarizing messages by topic in a communication application at a computing device is disclosed. The technique includes receiving, at a computing device executing a communication application for a first user, a plurality of messages corresponding to a communication session between the first user and a second user. The plurality of messages can be evaluated, at the computing device, to determine a plurality of communication topics of the communication session. User permission to utilize user data must also be received.

The technique can also include determining, at the computing device, a level of interest of the first user with respect to each of the plurality of communication topics. A plurality of user specific communication topics are identified, at the computing device, based on the determined levels of interest. A label for each of the user specific communication topics is generated at the computing device. Each label is descriptive of its associated user specific communication topic.

The computing device can cluster the plurality of messages into a plurality of groups of messages based on the plurality of user specific communication topics. Each particular group of the plurality of groups of messages is associated with a particular user specific communication topic of the plurality of user specific communication topics, and each message in the particular group is associated with the particular user specific communication topic. The computing device can then output a command to generate a graphical user interface corresponding to the communication application in which: (i) the plurality of messages are displayed in the plurality of groups of messages, and (ii) each group of the plurality of groups of messages is displayed with its associated label.

In some aspects, the evaluating the plurality of messages to determine the plurality of communication topics includes: extracting and disambiguating one or more entities from the plurality of messages; determining a topicality score for each of the one or more entities with respect to each particular message, wherein the topicality score of a particular entity is indicative of a measurement of a number of terms related to the particular entity in the particular message and at least one message proximate to the particular message; determining one or more topical entities for each particular message by comparing the topicality scores to a topicality threshold; and associating each of the one or more topical entities with at least one of the plurality of communication topics.

Further, in some aspects, the level of interest of the first user with respect to each of the plurality of communication topics can be based on behavior of the first user in the communication session and/or based on a user profile of the first user.

Additionally or alternatively, the techniques can include determining, at the computing device, a boundary between a first group and a second group of the plurality of groups of messages, wherein the boundary identifies a change in user specific communication topics between the first and second groups of messages. In some implementations, determining the boundary can include determining, at the computing device, whether each particular message is responsive to a previous message, wherein the particular message is clustered with the previous message into a same group of the plurality of when the particular message is responsive to the previous message. Determining whether each particular message is responsive to a previous message can be based on at least one of: (i) a sent time of the particular message, (ii) a difference between the sent time of the particular message and a read time of the previous message, the read time comprising an estimated time that the previous message was read by a sending user that sent the particular message, and (iii) whether the sending user initiated the particular message via the communication application directly or a notification output by the communication application.

Furthermore, the techniques can include receiving, at the computing device and from the first user, a user input to ungroup a first group of the plurality of groups of messages. In response to receiving the user input, the techniques can include modifying, at the computing device, the graphical user interface to display either: (i) a plurality of sub-groups of the messages in the first group, or (ii) each message in the first group. In some aspects, the first group of the plurality of groups of messages is associated with a first user specific communication topic, each of the plurality of sub-groups is associated with a particular user specific communication sub-topic, and each particular user specific communication sub-topic is related to the first user specific communication topic of the first group.

The present disclosure is further directed to a non-transitory computer-readable storage medium having a plurality of instructions stored thereon, which, when executed by one or more processors, cause the one or more processors to perform operations of the techniques described herein. The present disclosure is also directed to a computing device comprising one or more processors executing a communication application for a first user, and a non-transitory computer-readable storage medium having a plurality of instructions stored thereon, which, when executed by the one or more processors, cause the one or more processors to perform operations of the techniques described herein.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
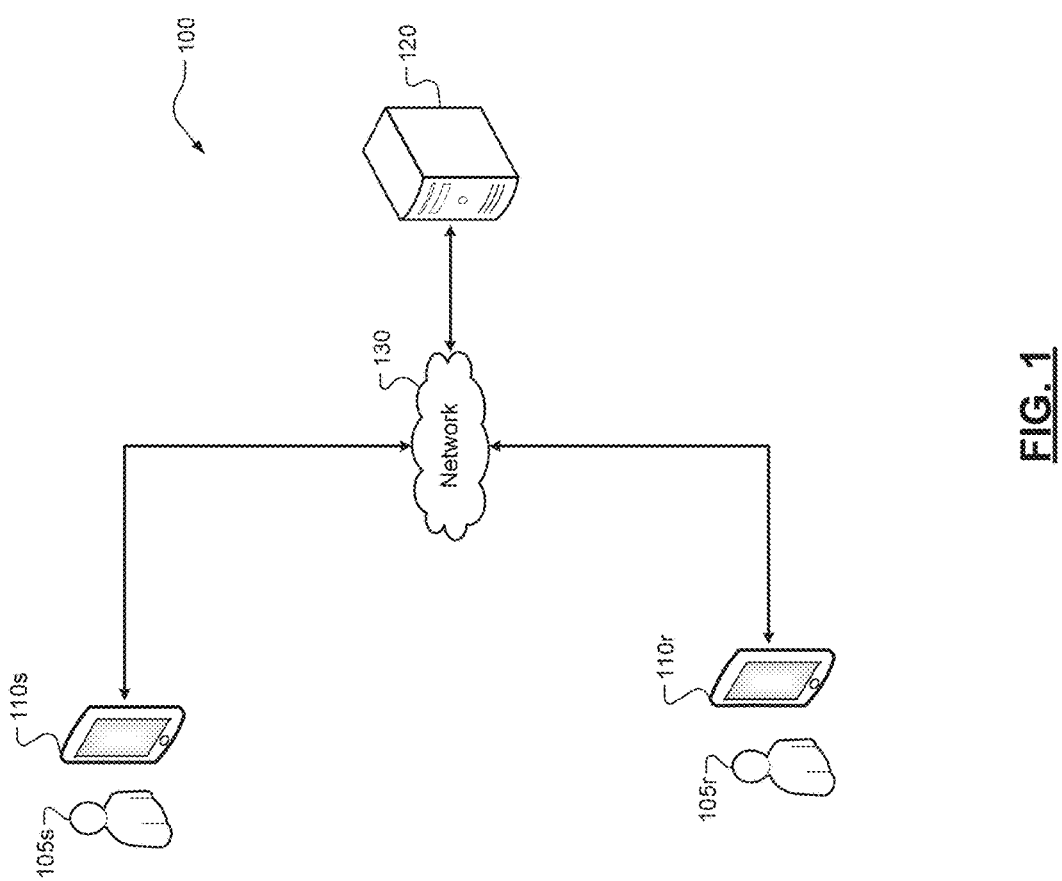
FIG. 1 is a diagram of an example computing system including two example computing devices and an example server computing device and according to some implementations of the present disclosure.

The present disclosure is directed to automated techniques for grouping and summarizing messages by topic in a communication application at a computing device. The automated techniques provide a number of technical benefits, as described below. Such technical benefits include, inter alia, a reduction in the number of user inputs to obtain a desired outcome/result (e.g., to retrieve a desired message), a more efficient use of computing resources (e.g., reducing the number of memory retrieval operations), and a reduction in the power consumption of the computing device.

As mentioned above, text-based messages (instant messages, short message service messages, social network messages/postings, etc.) in typical communication applications executing at a computing device (such as a mobile phone) are displayed in a graphical user interface in a chronologically ordered list. A communication session may include many messages that were sent over a long period of time (days, weeks, etc.). In order for a user to find a previously sent message of interest, the user may have to scroll through the list of messages, and scan the contents of each of the messages to locate the desired message (or collection of messages). In some situations, the user may remember an approximate date/time of the message of interest, which may be used to narrow the possible locations of the message of interest for the user. Nonetheless, even when the user has a general idea of the approximate date and time of a message of interest, locating the specific message of interest may be a time consuming and bothersome process.

Due to the relatively small display size of most mobile phones and the portion of a display of a computing device that is typically allocated to the communication application, the user may also have to provide a large number of repetitive inputs (e.g., swipes, pressing an arrow or page up/down key) to scroll through a long list of messages to find a message of interest. The computing device must receive and process each of the user inputs, and then execute the function associated with each user input. Furthermore, it is not unusual for the user to scroll so quickly that the message of interest (or what the user believes may be the message of interest) is skipped, which requires the user to scroll back the opposite direction to review the skipped messages. Thus, the computing device may have to retrieve from memory and display many messages that are of no interest to the user, which results in increased power consumption of the computing device. Furthermore, a reduction in the number of user inputs required for the user to retrieve a desired message may also result in the more efficient use of computing resources.

The present disclosure is directed to automated techniques for grouping and summarizing messages by topic in a communication application at a computing device. A computing device executing a communication application receives a plurality of text-based messages between a plurality of users in a communication session. The text-based messages are evaluated to determine communication topics associated with the messages. For example only, the communication topics may be determined by utilizing a neural network or other type of model trained to identify topics present in the content of the messages. In alternative or additional aspects, word embeddings can be utilized to identify, inter alia, topic, sentiment, and/or syntactic information of the message, which can be utilized to derive the communication topics from the message. The evaluation and determination of communication topics are discussed more fully below.

For each user in the communication session, permission may be required to identify user specific communication topics from the determined communication topics. Any use of user data (user behavior, a user profile, etc.) must be explicitly authorized by that user. When such explicit permission is received, a level of interest in the communication topics can be determined. The determined level of interest is utilized by the computing device to identify user specific communication topics from the communication topics. For example only, in a communication session between a first and second user discussing an upcoming vacation to Hawaii, the computing device may determine that the communication topics include vacation, Hawaii, restaurants, sightseeing activities, hiking, shopping, and museums. The first user, based on her/his behavior during the communication session, user profile, etc., may have a relatively high level of interest in restaurants and shopping, while the second user may have a relatively high level of interest in hiking and sightseeing activities. Accordingly, the user specific communication topics for the first user may include Hawaii, restaurants, and shopping, and the user specific communication topics for the second user may include vacation, hiking, and sightseeing activities.

When explicit permission to utilize user data is not received, the determined level of interest and/or user specific communication topics can be based on other information. Examples of such other information include, but are not limited to, the number of terms related to a topic, the number of messages associated with a topic, and whether a topic is related to a topical entity (described below). It should be appreciated that, in situations when explicit permission to utilize user data is received, the determined level of interest and/or user specific communication topics can also be based on such other information.

The computing device may generate a label for each of the identified user specific communication topics. Each label is generally descriptive of its associated user specific communication topic. To continue with the above example, the label for the user specific communication topic "restaurants" could be "dining out" or "restaurants." In a further example, the user specific communication topics can be combined such that the label for the user specific communication topics "Hawaii" and "restaurants" could be "Dining out in Hawaii" or the like. More specific techniques for the "nesting" of user specific communication topics are described below.

The computing device can then cluster the plurality of text-based messages based on the user specific communication topics for each user to generate a plurality of groups of messages. Cluster analysis can be utilized to group the messages such that each group of messages is associated with at least one user specific communication topic, and all of the text-based messages in a group are associated with the same user specific communication topic(s). Such cluster analysis utilizes a model that groups items into clusters such that the items in each cluster are determined to be more similar to each other than items in other groups. Because the groups of messages are clustered based on user specific communication topics, which may differ between users, the clustered groups of messages may be different for each user in the communication session. In this manner, the groups can be personalized for each user such that the messages in a communication session are not only organized by topic, but by the topics in which each user is interested (if permission is granted by the user).

The clustering of the plurality of messages into groups can further be based on other factors, such as the sent times of the messages, the difference between the sent time of a message and a read time of a previous (earlier) message, and/or whether the sender of a message is determined to be responding to a particular message (e.g., the sender initiated the composition of a message via a notification output by the communication application). For example only, it may be reasonable to presume that a user that receives a notification of a first message on his/her computing device, launches the communication application via the notification, and then generates and sends a second text-based message is responding to the first message and, therefore, the first and second text-based messages should be associated with the same user specific communication topic.

The text-based messages may be displayed by the computing device in the groups of messages in a graphical user interface of the communication application. The label associated with each of the groups may also be displayed. In this manner, a user can review groups of messages (as opposed to the messages individually) and quickly ascertain the user specific communication topic associated with each of the groups from the labels. Furthermore, because the groups of messages can be clustered based on user specific communication topics, the graphical user interface may appear different between different users participating in the same communication session.

Once a user identifies a group of messages that the user would like to read, a user can provide a user input (e.g., by clicking, touching, or otherwise selecting a particular group of messages) to display the messages within the selected group. In some implementations, groups of messages may be nested such that a particular group of messages associated with a user specific communication topic includes sub-groups of messages. Each of the sub-groups of messages may be associated with a user specific communication sub-topic. For example only, and to continue with the above example related to the topics vacation, Hawaii, restaurants, sightseeing activities, hiking, shopping, and museums, the user specific communication topic may be determined to be "Vacation to Hawaii" and the user specific communication sub-topics may be "Dining out in Hawaii," "Sightseeing in Hawaii," and the like. In such an implementations, the selection of a group may result in the display of the sub-groups (and associated labels), alone or in combination with at least a portion of the messages within the groups/sub-groups.

In some aspects, the text-based messages are not re-ordered when clustered and displayed into groups. That is, messages are presented in chronological order within the groups. Furthermore, the groups of messages may also be ordered chronologically. In such implementations, and as briefly mentioned above, the time (sent, received, read, etc.) of each message, as well as other factors, may also be utilized as signal(s) to assist in the clustering of the messages into groups. For example only, two messages that are evaluated and determined to relate to the same user specific communication topic, but which are separated by a number of other messages for which a different topic is (or no topic can be) determined, may be utilized as a signal to associate the other messages with the same user specific communication topic as the two messages.

Accordingly, in some aspects the computing device can determine boundaries between groups of messages, where a boundary between groups of messages can identify a change in user specific communication topics between groups of messages. For example only, the computing device can determine a boundary by determining if a particular text-based message is responsive to a previous text-based message and, if so, clustering the previous text-based message with the responsive text-based message. In addition or alternatively to utilizing the time of the message and/or whether the sender initiated the composition of the message via a notification as mentioned above, the computing device may utilize the content of one or both of the messages to determine whether the later message is responsive to the previous message. For example only, if the previous message includes an interrogative (how, why, what, which, where, etc.) or a punctuation mark associated with a question (such as a question mark), it may be reasonable to presume that the later message is responsive to the previous message.

In this manner, the present disclosure may provide one or more benefits, including, but not limited to, a cleaner, less cluttered user interface for a communication application, a more efficient or decrease in the use of computational resources, a reduction in power use of the computing device, and a reduction in the number of user inputs to obtain a desired result. For ease of description, the techniques of the present disclosure will be described in the context of a communication application that sends and receives messages. It should be appreciated, however, that the present disclosure is directed to any type of communication application that is utilized to transmit, post, etc. text-based messages, including, but not limited to, an instant messaging application, a social network, a bulletin board or other message posting service/website. Furthermore, it is specifically contemplated that the term text-based message as used herein can include messages that include pictures, graphics, emoji, etc. alone or in combination with text.

Referring now to FIG. 1, a diagram of an example computing system 100 is illustrated. The computing system 100 can be configured to implement a communication network amongst a plurality of users via their computing devices. The computing system 100 can include a plurality of example computing devices 110 and an example server 120 that communicate via a network 130 according to some implementations of the present disclosure.

For ease of description, in this application and as shown in FIG. 1, two example computing devices 110 are illustrated and described: a sending computing device 110s that is associated with a sender user 105s, and a receiving computing device 110r that is associated with a receiving user 105r. It should be appreciated, however, that each of the computing devices 110s and 110r can both send and receive instant messages and, thus, can be described as the "sending" computing device or the "receiving" computing device (and, similarly, the "sending" user or the "receiving" user) depending on the circumstances and the particular instant message that is being discussed. Thus, the term "computing device 110" shall be used herein to refer to the sending computing device 110s and the receiving computing device 110r, alone or in combination.

Figure 2:
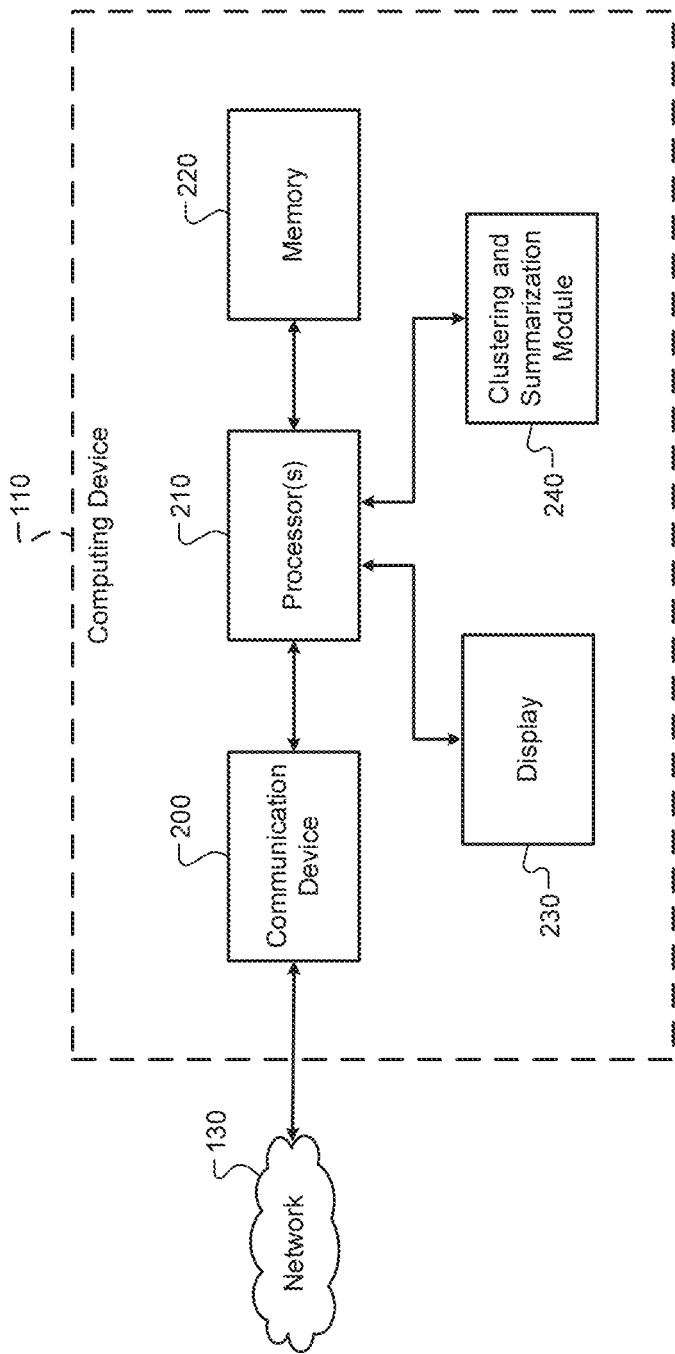
FIG. 2 is a functional block diagram of one example computing device of FIG. 1.

While illustrated as mobile phones ("smart" phones), each computing device 110 can be any type of suitable computing device, such as a desktop computer, a tablet computer, a laptop computer, a wearable computing device such as eyewear, a watch or other piece of jewelry, or clothing that incorporates a computing device. A functional block diagram of an example computing device 110 is illustrated in FIG. 2.

The computing device 110 can include a communication device 200, one more processors 210, a memory 220, a display device 230, and a clustering and summarization module 240. The processor(s) 210 can control operation of the computing device 110, including implementing at least a portion of the techniques of the present disclosure. The term "processor" as used herein is intended to refer to both a single processor and multiple processors operating together, e.g., in a parallel or distributed architecture.

The communication device 200 can be configured for communication with other devices (e.g., the server 120 or other computing devices 110) via the network 130. One non-limiting example of the communication device 200 is a transceiver, although other forms of hardware are within the scope of the present disclosure. The memory 220 can be any suitable storage medium (flash, hard disk, etc.) configured to store information. For example, the memory 220 may store a set of instructions that are executable by the processor 210, which cause the computing device 110 to perform operations, e.g., such as the operations of the present disclosure. The display device 230 can display information to the user 105. In some implementations, the display device 230 can comprise a touch-sensitive display device (such as a capacitive touchscreen and the like), although non-touch display devices are within the scope of the present disclosure.

The clustering and summarization module 240 can perform a number of functions related to the techniques of the present disclosure. For example only, the clustering and summarization model 240 can include one or more neural networks and/or other trained models that are configured to evaluate a plurality of messages to determine the communication topics discussed therein. Further, the clustering and summarization module 240 can include models for determining the level of interest of a user (upon receiving the appropriate permission) with respect to each determined communication topic. Based on the determined communication topics and levels of interest, the clustering and summarization module 240 can identify user specific communication topics for each user. The user specific communication topics can comprise a subset of the determined communication topics, e.g., the communication topics in which a user is determined to be (most) interested.

The clustering and summarization module 240 can also generate a label for each communication topic/user specific communication topic, where a label is a summarization, or is generally descriptive, of its associated communication topic. Further, the clustering and summarization module 240 can cluster the plurality of messages into a plurality of groups of messages for each user and based on the user specific communication topics. Although illustrated as a separate element, it should be appreciated that the clustering and summarization module 240 can be partially or wholly implemented by processor 210 and/or the memory 220 (e.g., a database storing the parameters of the various models). The clustering and summarization module 240 and its functions are more fully discussed below.

It should be appreciated that the example server computing device 120 can include the same or similar components as the computing device 110, and thus can be configured to perform some or all of the techniques of the present disclosure, which are described more fully below. Further, while the techniques of the present disclosure are described herein in the context of a computing device 110, it is specifically contemplated that each feature of the techniques may be performed by a computing device 110 alone, a plurality of computing devices 110 operating together, a server computing device 120 alone, a plurality of server computing devices 120 operating together, and a combination of one or more computing devices 110 and one or more server computing devices 120 operating together. Thus, for the sake of simplicity, in the following description the term "computing device 110" should be interpreted to include all of these various options, including the use of server computing device(s) 120 alone.

Figure 3:
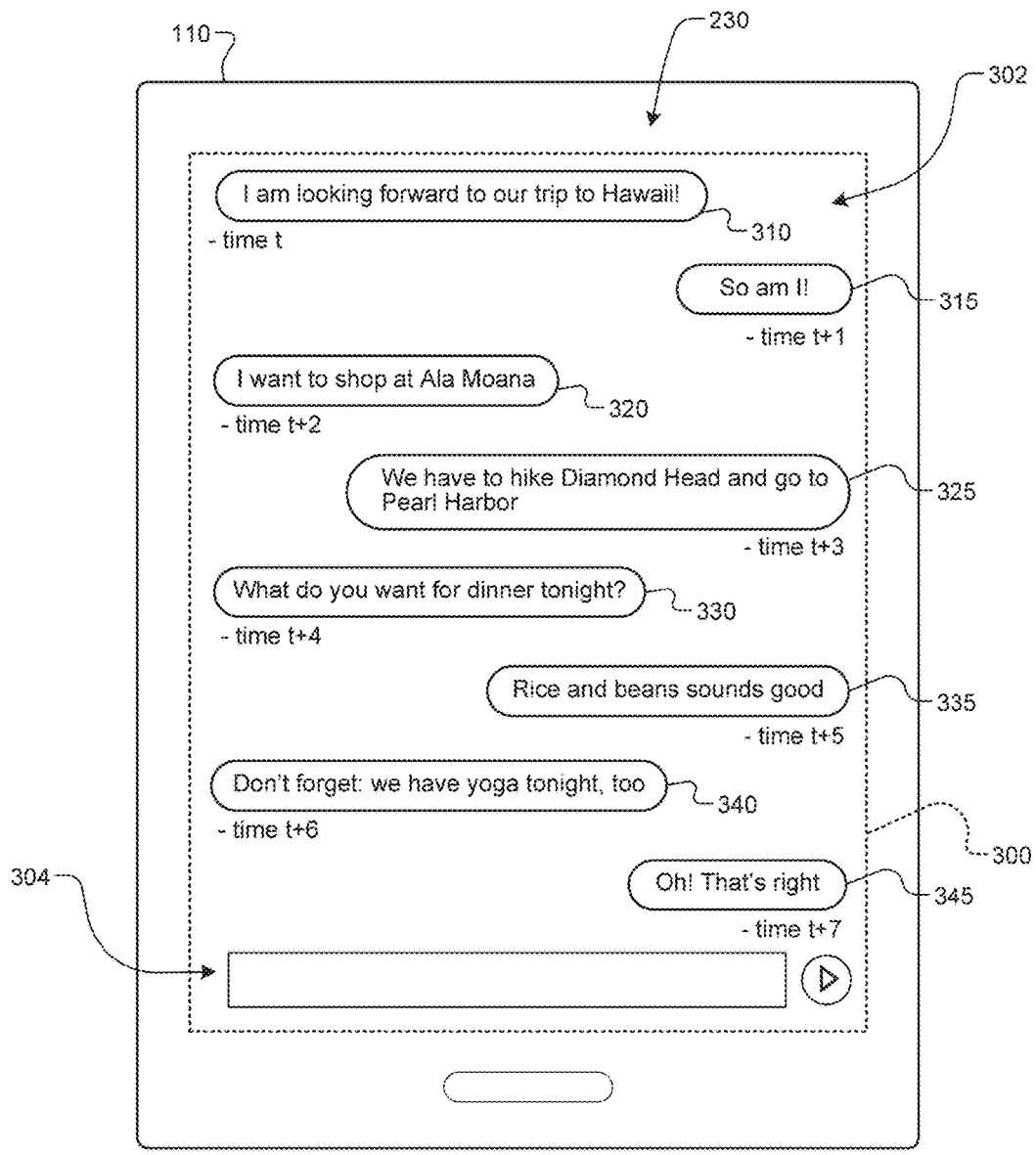
FIG. 3 is a diagram of an example graphical user interface according to some implementations of the present disclosure.

With reference to FIG. 3, an example GUI 300 that can be displayed by the display device 230 of the example computing device 110 when executing a communication application according to certain implementations of the present disclosure is shown. The illustrated GUI 300 includes a message display portion 302 and a message input portion 304. Messages that are sent or received can be displayed in the message display portion 302, and a user 105 can provide textual or other input in the message input portion 304, e.g., via a virtual keyboard (not shown) or other user input device.

A first message 310 can be received by the computing device 110. The first message 310 includes content that can, e.g., include text such as one or more words. In the illustrated example, the first message 310 includes the text content "I am looking forward to our trip to Hawaii!" The first message 310 is associated with a timestamp of "time t" and was sent by the sending user 105s via the sending computing device 110s. The first message 310 can be displayed in the message display portion 302. A receiving user 105r associated with the computing device 110 can read or otherwise perceive the text content of the first message 310 (e.g., by hearing an audio output representative of the text content via a text-to-speech functionality) and respond with a second message "So am I!" 315 as shown.

A third message of "I want to shop at Ala Moana" 320 can be received at time t+2, which is followed by a fourth message of "We have to hike Diamond Head and go to Pearl Harbor" 325 at time t+4. Then, a fifth message ("What do you want for dinner tonight?") 330, a sixth message ("Rice and beans sounds good") 335, a seventh message ("Don't forget: we have yoga tonight, too") 340, and an eighth message ("Oh! That's right") 345 can be received and associated with times t+4 to t+7, respectively. Each of these messages can be displayed, as shown in FIG. 3, in chronological order in the GUI 300.

As mentioned above, displaying messages 310-345 from a communication session in a chronological list (e.g., as shown in FIG. 3) may, in some circumstances, result in an inefficient use of computing resources, available display space, and/or power consumption of the computing device 110. This may be particularly true for a communication session that includes a relatively high number of messages and/or is of a relatively long duration as such communication sessions tend to be more difficult for a user 105 to efficiently search. In order to address these and other issues, the present disclosure is directed to automated techniques for grouping messages by topics, as well as displaying the generated groups of messages with labels that summarize the messages, e.g., by identifying the topics of the messages in the groups.

Figure 4:
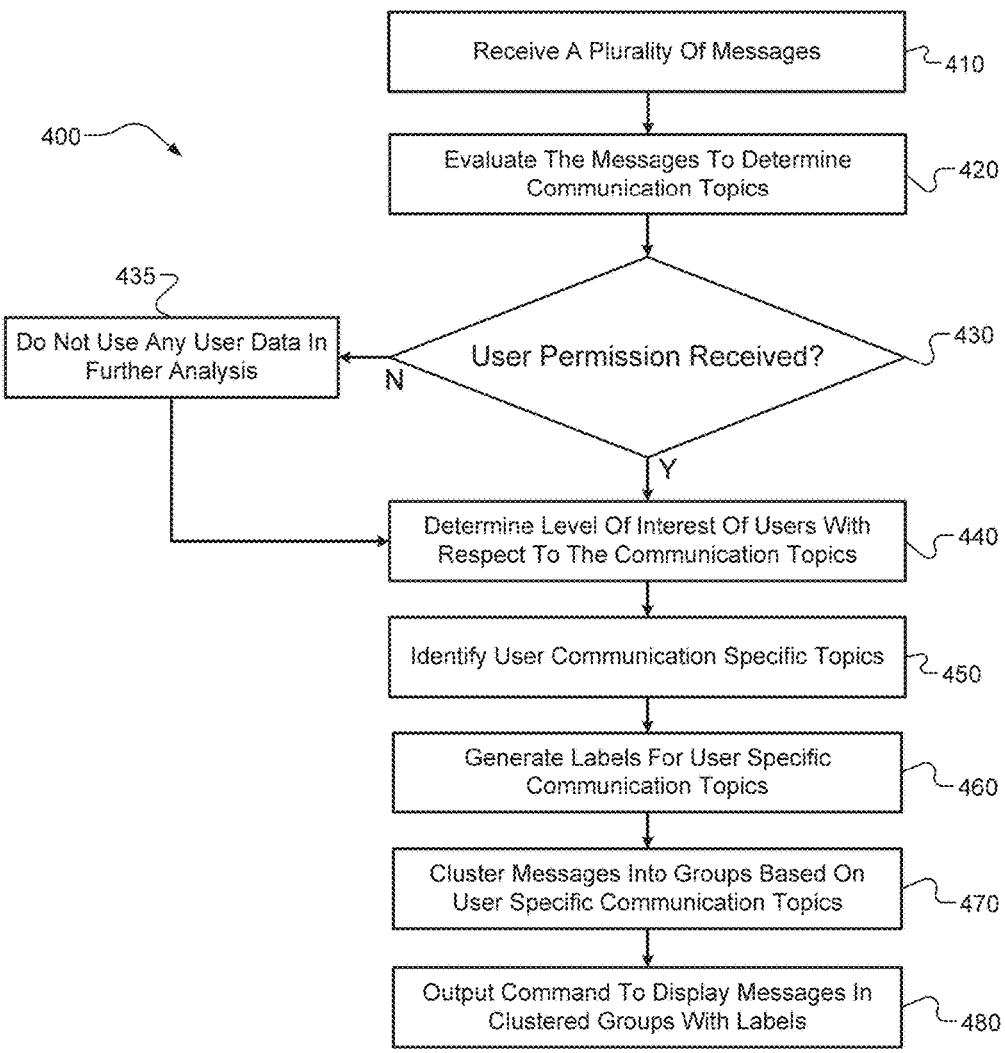
FIG. 4 is a flow diagram of an example technique for grouping and summarizing messages according to some implementations of the present disclosure.

Referring now to FIG. 4, a method 400 for grouping and summarizing messages is disclosed. At 410, the computing device 110 can receive a plurality of text-based messages (such as messages 310-345) that correspond to a communication session between a first and second user 110 in a communication application executing at the computing device 110. The computing device 110 can evaluate (420) the messages 310-345 to determine a plurality of communication topics of the communication session. At 430, the computing device 110 can determine whether explicit user permission to use any type of user data has been received. If explicit user permission has not been received, the computing device 110 will not use (435) any user data to perform the method 400 and proceed to 440. If, however, explicit user permission is been received, the method 400 may proceed to use—subject to the limits of, and in accordance with, the granted user permission—user data and proceed to 440.

The computing device 110 can further determine (440) a level of interest of the user 105 with respect to the determined communication topics. At 450, the computing device 110 can identify user specific communication topics based on the determined level of interest, and can generate (at 460) a label for each user specific communication topic.

The computing device 110 can cluster (470) the plurality of messages into a plurality of groups based on the user specific communication topics identified at 450. Each particular group of messages can be associated with a particular user specific communication topic, and each message in a group will be associated with the same user specific communication topic for the group. At 480, the computing device 110 can output a command to generate a GUI corresponding to the communication application in which the messages are displayed in the clustered groups. Each group may also be displayed with its associated label, which can assist the user 105 in identifying the user specific communication topic associated with the groups.

Figure 5:
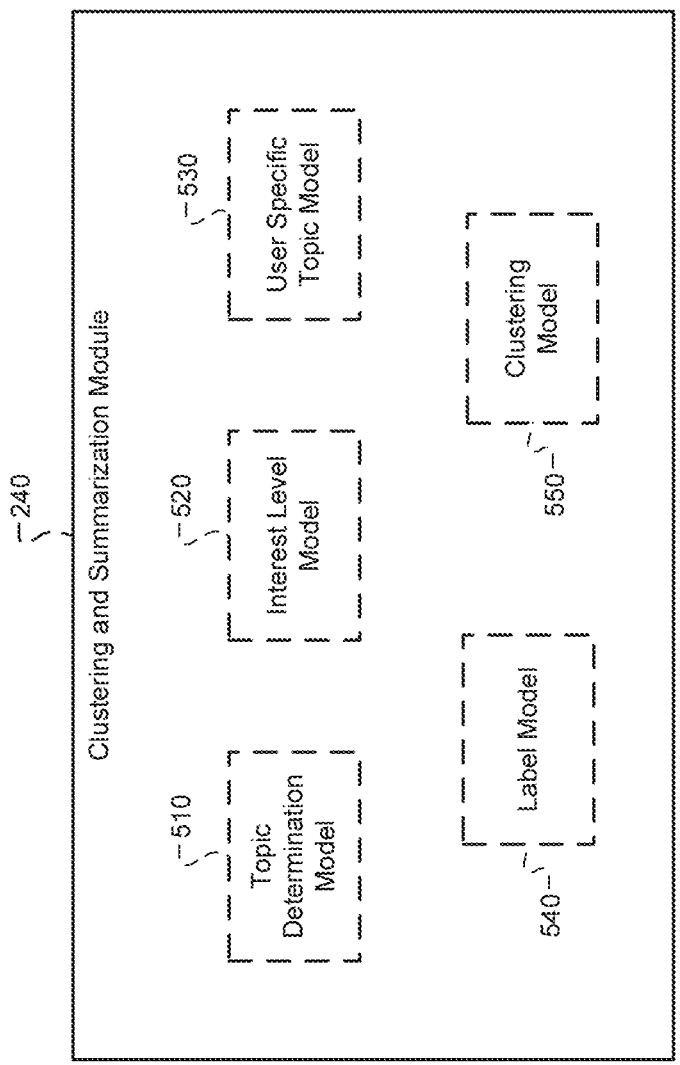
FIG. 5 is a functional block diagram of an example clustering and summarization module of FIG. 2.

With additional reference to FIG. 5, example components of a clustering and summarization module 240 are illustrated. As mentioned above, the clustering and summarization module 240 can perform (alone or in conjunction with other computing devices or components thereof) one or more of the functions related to the method 400. The clustering and summarization module 240 can include a Topic Determination Model 510 that can evaluate (420) the messages 310-345 to determine a plurality of communication topics of the communication session. The Topic Determination Model 510 can comprise a neural network or other type of model trained to identify topics present in the content of the messages. In alternative or additional aspects, word embeddings can be utilized to identify, inter alia, topic, sentiment, and/or syntactic information of the message, which can be utilized to derive the communication topics from the message. In some aspects, the Topic Determination Model 510 can comprise a machine learning classifier trained to identify topics from labeled training data. In various implementations, the machine learning model can be trained based on labeled training data comprising a plurality of messages that are labeled with topics. It should be appreciated that any type of machine learning model can be utilized, such as those trained via supervised learning, unsupervised learning, and a combination thereof, as well as neural networks, etc.

In some example implementations, the Topic Determination Model 510 can extract and disambiguate entities from the messages via an entity recognition process. An "entity" can be any object or concept that can be labeled, identified, or otherwise named. Examples of entities include, but are not limited to, persons, places, things, products, concepts (tomorrow, tonight, etc.), and companies, as well as "named entities" (entities that can be identified with a proper name). The process of disambiguation of entities attempts to more fully identify a potentially ambiguous entity. For example only, the entity "Thursday" can generally refer to any Thursday of any week. However, the use of the term "this Thursday" may be more fully identified as a specific entity (date) if the computing device 110 is aware of the context (e.g., the date) of the message in which the entity is present.

The Topic Determination Model 510 can further determine a topicality score for some or all of the identified entities. A topicality score of a particular entity can, e.g., be determined to be a measurement of the number of terms related to the particular entity in the message from which it was extracted. In some implementations, a topicality score of a particular entity can additionally or alternatively include a measurement of the number of terms related to the particular entity in one or more messages proximate to the message from which it was extracted.

One or more topical entities for each message can also be determined by the Topic Determination Model 510 based on the topicality scores. In one example, the topicality scores of an entity can be compared to a topicality threshold. When the topicality score of a particular entity with respect to a message is satisfied, the particular entity may be classified as topical for that message (or for a group of messages).

In the communication session illustrated in FIG. 3, for example, the entity "Hawaii" may be determined to be a topical entity based on the number of terms related to "Hawaii" in the messages 310, 320, and 325. The computing device 110 can recognize and identify a relationship between the terms (entities) "Hawaii," "Ala Moana," "Diamond Head," and "Pearl Harbor" and may determine the topicality score of "Hawaii" to satisfy the topicality threshold.

Topical entities, or all identified entities, can be associated with at least one determined communication topic. In some aspects, an entity itself can be identified as a communication topic, or portion thereof. For example only, in the messages illustrated in FIG. 3, the topical entity "Hawaii" can be identified as/associated with the communication topic "Hawaii." Similarly, the entity "Pearl Harbor" may be identified as/associated with the communication topics "Pearl Harbor," "Hawaii," and "museum" and the like. The association of entities (topical or otherwise) to communication topics can be, e.g., based on a machine learning model, such as a classifier.

The clustering and summarization module 240 can also utilize an Interest Level Model 520 that can determine (440) a level of interest of a user 105 with respect to each of the communication topics. As noted above, any user data that is utilized by the Interest Level Model 520 must be explicitly permitted (at 430). In some aspects, the Interest Level Model 520 can determine the level of interest of a user 105 based on the behavior of the user 105 within the communication session. For example only, if the messages sent by a user 105 within the communication session repeatedly relate to a specific communication topic, the level of interest with respect to that specific communication topic for the user 105 may be determined to be relatively high. In additional or alternative implementations, the Interest Level Model 520 can determine the level of interest of a user 105 based on a user profile and/or other behavior of the user 105 outside of the communication session. In some aspects, a user 105 may be asked to identify one or more topics in which she/he has a relatively high level of interest.

A User Specific Topic Model 530 of the clustering and summarization module 240 can identify (450) user specific communication topics from the determined (at 420) communication topics based on the levels of interest determined at 440. Further, the clustering and summarization module 240 can also include a Label Model 540 configured to generate a label for, and that is descriptive of, each of the user specific communication topics. In some implementations, the Label Model 540 can comprise a classifier. In other implementations, the Label Model 540 can leverage the communication topics, entities, etc. that were identified or otherwise determined as labels. For example only, the determined communication topic of "Hawaii" may be assigned a label "Hawaii" by the Label Model 540.

In additional or alternative aspects, the Label Model 540 may combine communication topics (user specific or otherwise) to generate a label for a communication topic. In the communication session illustrated in FIG. 3, e.g., the Label Model 540 may combine the communication topics of "Hawaii" and "trip" to generate a label of "Trip to Hawaii" or the like.

A Clustering Model 550 can also be included in the clustering and summarization module 240. The Clustering Model 550 is a model trained to perform cluster analysis in which items are grouped (clustered) such that items in each group are determined to be more similar to each other than items in the other groups. In the present disclosure, the Clustering Model 550 is trained to group messages based on the user specific communication topics such that each group is associated with a user specific communication topic, and each message in a group is associated with the particular user specific communication topic associated with its group.

The Clustering Model 550 can, in certain aspects, be trained to group the messages based on other factors in addition to the user specific communication topics, such as the sent times of the messages, the difference between the sent time of a message and a read time of a previous (earlier) message, and/or whether the sender of a message is determined to be responding to a particular message (e.g., the sender initiated the composition of a message via a notification output by the communication application). For example only, the Clustering Model 550 can retain the chronological order of the messages both within the groups and/or between groups. That is, the Clustering Model 550 can generate groups of messages in which the messages are chronologically ordered, and/or the plurality of groups can be chronologically ordered.

In such implementations, the clustering and summarization module 240 (e.g., at the Clustering Model 550) may determine boundaries between groups of messages, where a boundary between groups of messages identifies a change in user specific communication topics between the groups. For example only, in order to determine a boundary between groups of messages, the Clustering Model 550 can determine whether each particular message in the communication session is responsive to a previous message. The Clustering Model 550 can utilize this responsiveness information to cluster each responsive message and the message to which it is responsive into the same group. That is, when a particular message (such as, "Rice and beans sounds good" 335) is determined to be responsive to a previous message ("What do you want for dinner tonight?" 330), the particular message and the previous message can be clustered into the same group (e.g., with a topic/label of "Tonight").

The Clustering Model 550 can include a model trained on training data comprising a collection of messages that are marked as responsive (positive examples) and/or non-responsive (negative examples) to determine features of messages that are indicative of responsiveness. In some aspects, a sent time of a particular message (the sent times of messages) can be utilized to determine whether it is responsive to a previous message. For example only, it may be that a particular message with a sent time that is shortly after the sent time of a previous message indicates that the particular message is more likely to be responsive to the previous message. In another example, a difference between the sent time of the particular message and a read time of the previous message by the user 150 can be utilized to determine whether a message is responsive. Similar to the sent time example above, it may be that a particular message sent by a first user at a sent time that is shortly after the time that the first user is estimated to have read a previous message (read time) indicates that the particular message is more likely to be responsive to the previous message.

Another example feature that can be utilized to determine responsiveness is whether the user (sending user) initiated a particular text-based message via the messaging application directly, or via a notification output by the communication application (e.g., utilizing a notification functionality of the computing device 110 separate from the communication application). For example only, it may be that a user that receives a notification of a first message on his/her computing device, launches the communication application via the notification, and then generates and sends a second text-based message is indicative of the second message being more likely to be responsive to the previous (first) message. From this information, the computing device 110 may infer that the first and second text-based messages should be grouped and associated with the same user specific communication topic.

Additionally or alternatively, the content of the messages can be used to determine whether the later message is responsive to the previous message. For example only, a previous message that includes an interrogative (how, why, what, which, where, etc.) or a punctuation mark associated with a question (such as a question mark) may be indicative that a following message (e.g., the next message) is more likely to be responsive to the previous message. In yet another example, if a previous message includes a word indicative of a category or set of items/objects (such as a message "color") without an interrogative word or punctuation mark, but a following message includes a word indicative of a particular member/item/object in the category or set (such as "blue"), the following message may be more likely to be responsive to the previous message.

It should be appreciated that, although the various different models (510-550) are described as separate models that function separately, the present disclosure contemplates that a combination of some or all of the models (or features thereof) may be utilized by the computing device 110. Further, it is specifically contemplated that each of the described features and models can be utilized separately or together in any combination, except as noted.

Figure 6:
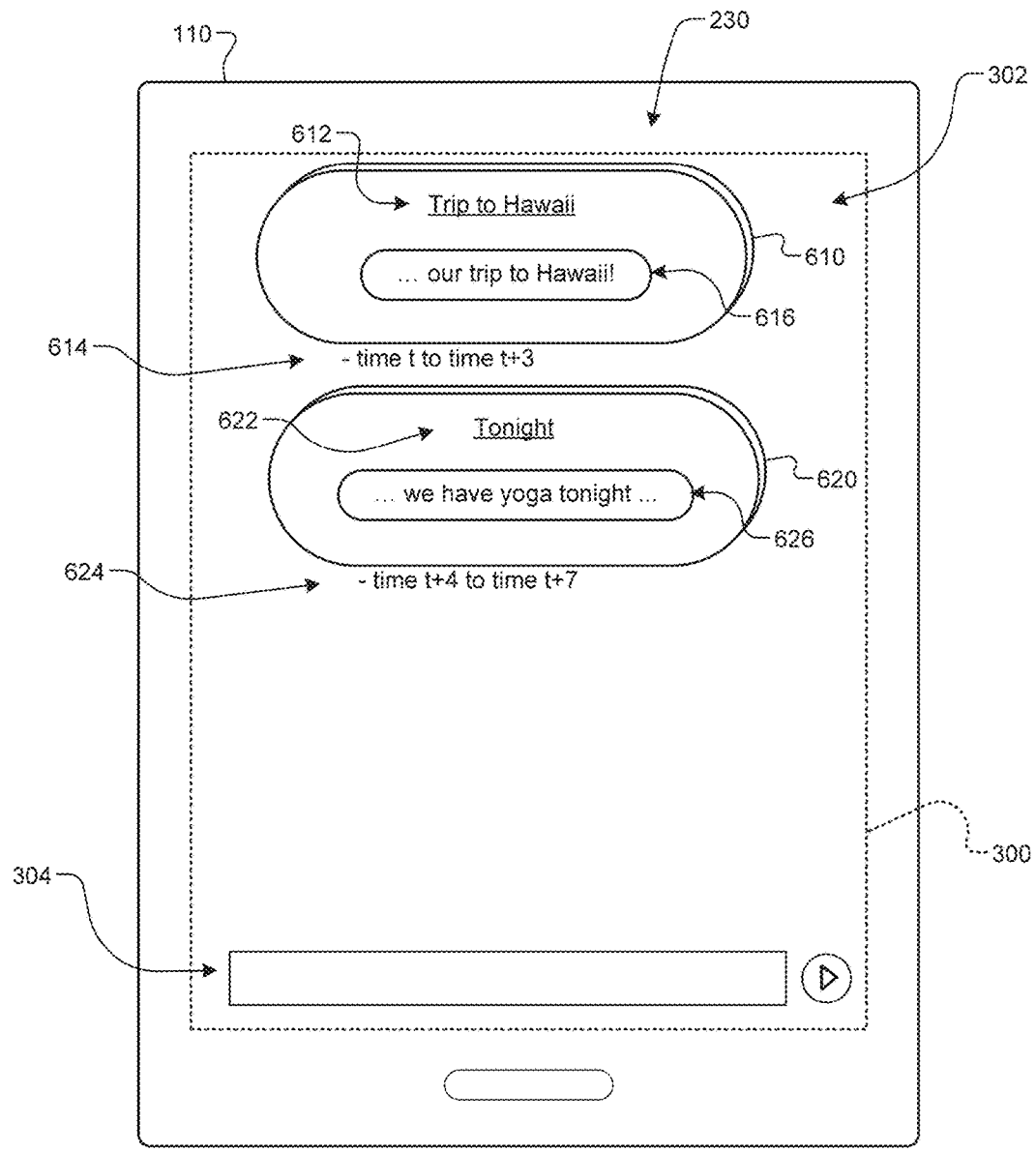
FIG. 6 is a diagram of another example graphical user interface according to some implementations of the present disclosure.

As mentioned above, the computing device 110 can output a command to generate a GUI 300 corresponding to the communication application in which the messages are displayed in the clustered groups. Referring now to FIG. 6, the example GUI 300 is shown as being modified to include displayed groups 610, 620 instead of the messages 310-345 as shown in FIG. 3. Each group 610, 620 may also be displayed with its associated label 612, 622, respectively. In some implementations, each group 610, 620 may also be displayed with a time indicator 614, 624, respectively, that is indicative of an approximate date, day, time, etc. of the messages in the group with which it is associated.

In some implementations each group 610, 620 can also or alternatively include a snippet 616, 626 (one or more portions) of a message or messages in the group. This snippet can be selected/generated by the Label Model 540, and can also be designated as the label in some implementations. For example only, the Label Model 540 can select a message (or portion thereof) based on the presence of one or more of the topical entities therein.

In the illustrated example of FIG. 6, group 610 corresponds to messages 310, 315, 320, and 325 from FIG. 3, and group 620 corresponds to messages 330, 335, 340, and 345. Group 610 is displayed with the label 612 "Trip to Hawaii" and the snippet 616 " . . . our trip to Hawaii!" Similarly, group 620 is displayed with the label 622 "Tonight" and the snippet 626 " . . . we have yoga tonight . . . " as shown. As described above, the groups 610, 620 may have been generated based on the user specific communication topics for each user 105. Thus, the illustrated groups 610, 620 may correspond to one or both of the users 105*r*, 105*s*.

Figure 7:
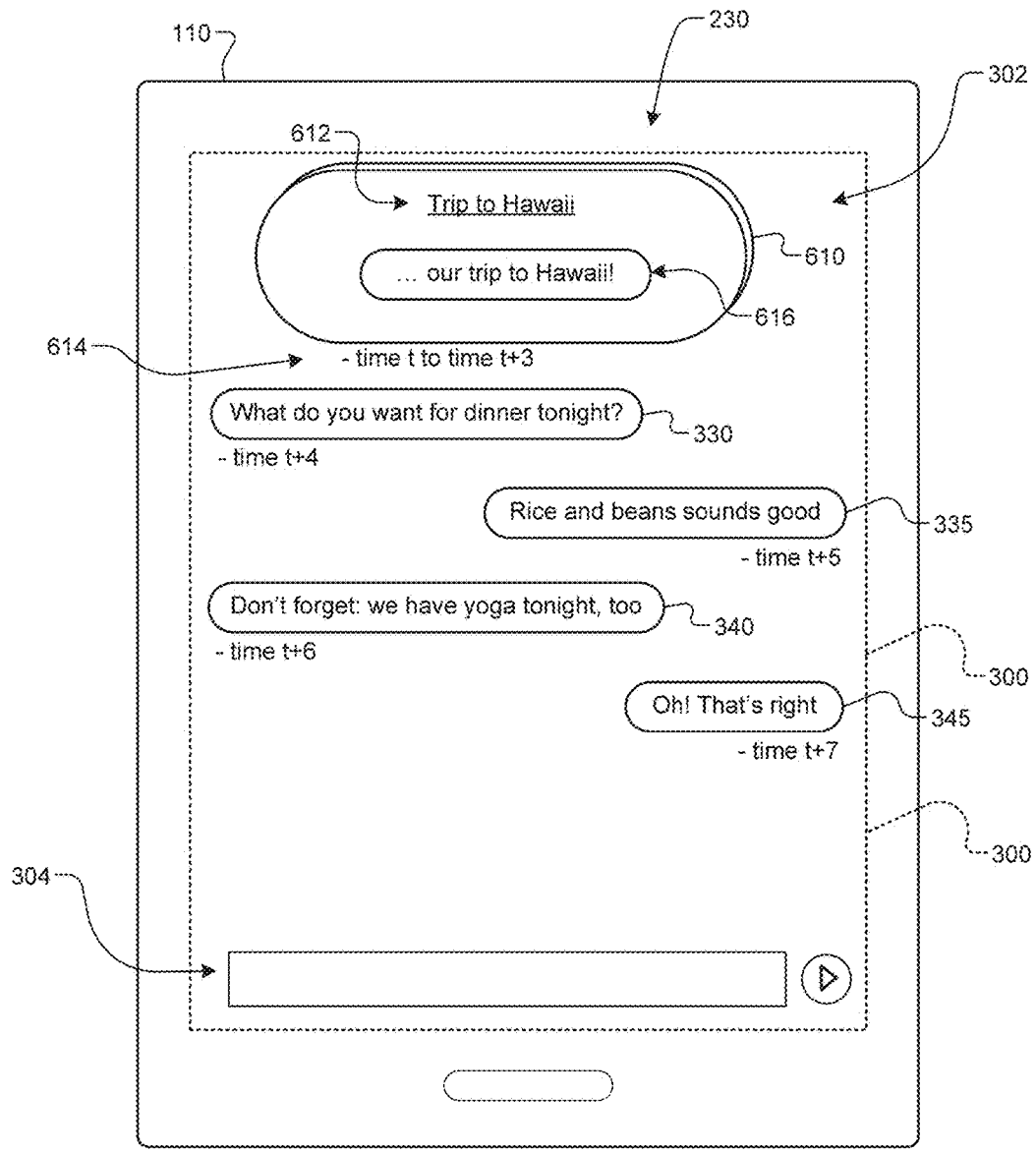
FIG. 7 is a diagram of another example graphical user interface according to some implementations of the present disclosure.

A user 105 can provide a user input to select to ungroup a group 610, 620 of messages, e.g., by clicking a group, touching a touchscreen at the displayed location of a group, or a keyboard input. With further reference to FIG. 7, the example GUI 300 is shown as being modified to include the displayed group 610 and messages 330-345 resulting from a user input to ungroup the group 620. The GUI 300 can also be provided with a toggle input (not shown) that allows a user 105 to easily re-group messages that have been ungrouped.

Figure 8:
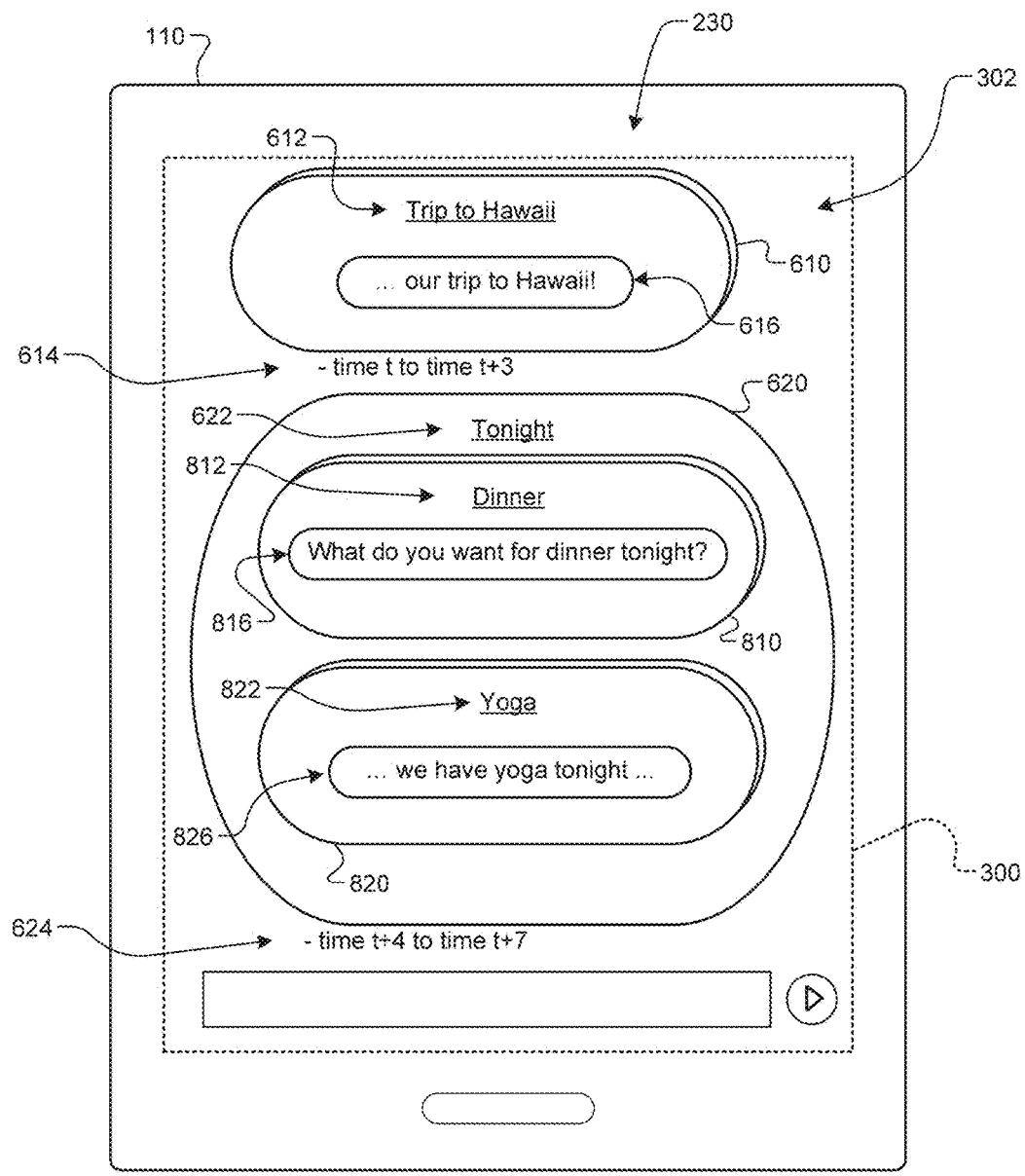
FIG. 8 is a diagram of another example graphical user interface according to some implementations of the present disclosure.

The description above is directed to clustering messages into groups, but is equally applicable to grouping messages into groups, sub-groups, and so on, by nesting user specific communication topics, with user specific communication sub-topics, etc. Referring now to FIG. 8, the example GUI 300 is shown as being modified to illustrate the display of sub-groups 810, 820 of the group 620. For example only, a user 105 may have provided an input to ungroup group 620 (from the GUI 300 of FIG. 6). Rather than displaying messages 330-345 as shown in FIG. 7, the computing device 110 has instead displayed a plurality of sub-groups 810, 820.

Similar to the groups 610, 620 described above, each sub-group 810, 820 can be displayed with a label (812, 822) and/or a snippet (816, 826) of the messages in that sub-group. Although shown as including the time indicator 624 for the group 620, alternatively or additionally each sub-group 810, 820 could be displayed with separate time indicators that are indicative of an approximate date, day, time, etc. of the messages in the sub-group with which it is associated.

The method for generating sub-groups 810, 820 can be the same as, or similar to, the method for generating groups as described above. In some implementations, the computing device 110 will determine whether or not to generate sub-groups within a group of messages based on the number of messages within the group. For example only, when the number of messages within a particular group is greater than a threshold, the computing device 110 may evaluate the messages within that particular group to cluster the messages into sub-groups based on user specific communication sub-topics.

Additionally or alternatively, the computing device 110 may determine whether or not to generate sub-groups within a group of messages based on a similarity score of the communication topics between the messages. The similarity score can be any measurement indicative of the level of similarity between topics. For example only, in a single group of messages, a first number of messages can relate to a first communication (sub) topic, and a second number of messages subsequent to the first number of messages can relate to a different second communication (sub) topic. To be in the single group, the messages in the first and second numbers of messages can relate to the same user specific communication topic, while also relating to other communication topics. If the other communication topics have a similarity score indicative of a low level of similarity, the computing device 110 can determine to generate sub-groups from the first and second numbers of messages.

The computing device 110 can also determine whether to combine previously generated groups of messages into a super-group, thereby effectively changing the status of the previously generated groups to "sub-groups" of a "super" group. Similar to the determination of whether to generate sub-groups, the computing device 110 can determine whether or not to combine groups into a super-group based on the number of messages within the groups, and/or a similarity score of the user specific communication topics between the groups. For example only, if the user specific communication topics for two adjacent groups of messages have a similarity score indicative of a high level of similarity, the computing device 110 can determine to generate a new (super) group from the adjacent groups, while retaining the original groups as sub-groups.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in various different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in one or more ways. Such variations are not to be regarded as a departure from the disclosure, and all such modifications are intended to be included within the scope of the disclosure.

What is claimed is:

1. A computer-implemented method, comprising:
   receiving, at a computing device executing a communication application for a first user, a plurality of messages corresponding to a communication session between the first user and a second user;
   evaluating, at the computing device, the plurality of messages to determine a plurality of communication topics of the communication session;
   receiving, at the computing device, user permission to utilize user data;
   determining, at the computing device, a level of interest of the first user with respect to each of the plurality of communication topics based at least in part on the user data of the first user;
   identifying for the first user, at the computing device, a plurality of user specific communication topics of the plurality of communication topics based on the determined level of interest of the first user, wherein the plurality of user specific communication topics for the first user are different from a plurality of user specific communication topics for the second user identified based on a level of interest of the second user;
   generating, at the computing device, a label for each of the user specific communication topics, wherein each label is descriptive of an associated user specific communication topic;
   clustering, at the computing device, the plurality of messages into a plurality of groups of messages based on the plurality of user specific communication topics, wherein each particular group of the plurality of groups of messages is associated with a particular user specific communication topic of the plurality of user specific communication topics, and wherein each message in the particular group is associated with the particular user specific communication topic; and
   outputting, at the computing device, a command to generate a graphical user interface corresponding to the communication application in which: (i) the plurality of messages are displayed in the plurality of groups of messages, and (ii) each group of the plurality of groups of messages is displayed with its associated label, wherein the label associated with at least one group of the plurality of groups is a snippet generated from a message in the at least one group and wherein the snippet includes the message or a portion of the message.

2. The computer-implemented method of claim 1, wherein evaluating the plurality of messages to determine the plurality of communication topics comprises:
   extracting and disambiguating one or more entities from the plurality of messages;
   determining a topicality score for each of the one or more entities with respect to each particular message, wherein the topicality score of a particular entity is indicative of a measurement of a number of terms related to the particular entity in the particular message and at least one message proximate to the particular message;
   determining one or more topical entities for each particular message by comparing the topicality scores to a topicality threshold; and
   associating each of the one or more topical entities with at least one of the plurality of communication topics.

3. The computer-implemented method of claim 1, wherein the level of interest of the first user with respect to each of the plurality of communication topics is based on behavior of the first user in the communication session or a user profile of the first user.

4. The computer-implemented method of claim 1, wherein the message or the portion of the message that is included in the snippet is selected based on a presence of the particular user specific communication topic.

5. The computer-implemented method of claim 1, wherein the plurality of messages are chronologically ordered in each of the plurality of groups, and the plurality of groups is chronologically ordered.

6. The computer-implemented method of claim 1, further comprising:
   determining, at the computing device, a boundary between a first group and a second group of the plurality of groups of messages, wherein the boundary identifies a change in user specific communication topics between the first and second groups of messages.

7. The computer-implemented method of claim 6, wherein determining the boundary comprises:
   determining, at the computing device, whether each particular message is responsive to a previous message, wherein the particular message is clustered with the previous message into a same group of the plurality of when the particular message is responsive to the previous message.

8. The computer-implemented method of claim 7, wherein determining whether each particular message is responsive to a previous message is based on at least one of a sent time of the particular message, a difference between the sent time of the particular message and a read time of the previous message, the read time comprising an estimated time that the previous message was read by a sending user that sent the particular message, or whether the sending user initiated the particular message via the communication application directly or a notification output by the communication application.

9. The computer-implemented method of claim 1, further comprising:
   receiving, at the computing device and from the first user, a user input to ungroup a first group of the plurality of groups of messages; and in response to receiving the user input, modifying, at the computing device, the graphical user interface to display one of a plurality of sub-groups of the messages in the first group, or each message in the first group.

10. The computer-implemented method of claim 9, wherein:
the first group of the plurality of groups of messages is associated with a first user specific communication topic;
each sub-group of the plurality of sub-groups is associated with a particular user specific communication sub-topic; and
each particular user specific communication sub-topic is related to the first user specific communication topic of the first group.

11. A computing device, comprising:
one or more processors executing a communication application for a first user; and
a non-transitory computer-readable storage medium having a plurality of instructions stored thereon, which, when executed by the one or more processors, cause the one or more processors to perform operations comprising:
receiving a plurality of messages corresponding to a communication session between the first user and a second user;
evaluating the plurality of messages to determine a plurality of communication topics of the communication session;
receiving user permission to utilize user data;
determining a level of interest of the first user with respect to each of the plurality of communication topics based at least in part on the user data of the first user;
identifying, for the first user, a plurality of user specific communication topics of the plurality of communication topics based on the determined level of interest of the first user, wherein the plurality of user specific communication topics for the first user includes at least one user specific communication topic that is not included in a plurality of user specific communication topics for the second user identified based on a level of interest of the second user;
generating a label for each of the user specific communication topics, wherein each label is descriptive of its associated user specific communication topic;
clustering the plurality of messages into a plurality of groups of messages based on the plurality of user specific communication topics, wherein each particular group of the plurality of groups of messages is associated with a particular user specific communication topic of the plurality of user specific communication topics, and wherein each message in the particular group is associated with the particular user specific communication topic; and
outputting a command to generate a graphical user interface corresponding to the communication application in which: (i) the plurality of messages are displayed in the plurality of groups of messages, and (ii) each group of the plurality of groups of messages is displayed with its associated label, wherein the label associated with at least one group of the plurality of groups is a snippet generated from a message in the at least one group and wherein the snippet includes the message or a portion of the message.

12. The computing device of claim 11, wherein evaluating the plurality of messages to determine the plurality of communication topics comprises:
extracting and disambiguating one or more entities from the plurality of messages;
determining a topicality score for each of the one or more entities with respect to each particular message, wherein the topicality score of a particular entity is indicative of a measurement of a number of terms related to the particular entity in the particular message and at least one message proximate to the particular message;
determining one or more topical entities for each particular message by comparing the topicality scores to a topicality threshold; and
associating each of the one or more topical entities with at least one of the plurality of communication topics.

13. The computing device of claim 11, wherein the level of interest of the first user with respect to each of the plurality of communication topics is based on behavior of the first user in the communication session or a user profile of the first user.

14. The computing device of claim 11, wherein the message or the portion of the message that is included in the snippet is selected based on a presence of the particular user specific communication topic.

15. The computing device of claim 11, wherein the plurality of messages are chronologically ordered in each of the plurality of groups, and the plurality of groups is chronologically ordered.

16. The computing device of claim 11, further comprising:
determining a boundary between a first group and a second group of the plurality of groups of messages, wherein the boundary identifies a change in user specific communication topics between the first and second groups of messages.

17. The computing device of claim 16, wherein determining the boundary comprises:
determining whether each particular message is responsive to a previous message, wherein the particular message is clustered with the previous message into a same group of the plurality of when the particular message is responsive to the previous message.

18. The computing device of claim 17, wherein determining whether each particular message is responsive to a previous message is based on at least one of a sent time of the particular message, a difference between the sent time of the particular message and a read time of the previous message, the read time comprising an estimated time that the previous message was read by a sending user that sent the particular message, or whether the sending user initiated the particular message via the communication application directly or a notification output by the communication application.

19. The computing device of claim 11, further comprising:
receiving, from the first user, a user input to ungroup a first group of the plurality of groups of messages; and
in response to receiving the user input, modifying the graphical user interface to display at least one of a plurality of sub-groups of the messages in the first group, or each message in the first group.

20. The computing device of claim 19, wherein:
the first group of the plurality of groups of messages is associated with a first user specific communication topic;

each sub-group of the plurality of sub-groups is associated with a particular user specific communication sub-topic; and
each particular user specific communication sub-topic is related to the first user specific communication topic of the first group.

* * * * *